United States Patent
Perez

(10) Patent No.: US 8,636,898 B2
(45) Date of Patent: Jan. 28, 2014

(54) SITE DRAINER

(76) Inventor: Antonio Perez, Clifton, NJ (US)

(*) Notice: Subject to any disclaimer, the term of this patent is extended or adjusted under 35 U.S.C. 154(b) by 448 days.

(21) Appl. No.: 13/098,624

(22) Filed: May 2, 2011

(65) Prior Publication Data

US 2011/0266201 A1 Nov. 3, 2011

Related U.S. Application Data

(60) Provisional application No. 61/329,641, filed on Apr. 30, 2010.

(51) Int. Cl.
*B01D 35/26* (2006.01)
(52) U.S. Cl.
USPC .......... 210/86; 210/238; 210/342; 210/416.1; 210/149; 417/423.3; 417/423.9
(58) Field of Classification Search
USPC ............. 417/313, 423.3, 423.9; 210/86, 238, 210/342, 416.1, 149
See application file for complete search history.

(56) References Cited

U.S. PATENT DOCUMENTS

| | | |
|---|---|---|
| 3,695,173 A | 10/1972 | Cox |
| 4,330,306 A | 5/1982 | Salant |
| 4,861,472 A | 8/1989 | Weis |
| 5,011,600 A | 4/1991 | Mowka, Jr. et al. |
| 5,030,346 A | 7/1991 | McEwen |
| 5,141,650 A | 8/1992 | Cavo et al. |
| 5,154,584 A | 10/1992 | McEwen |
| 5,160,039 A | 11/1992 | Colburn |
| 5,215,656 A | 6/1993 | Stoneburger et al. |
| 5,249,930 A * | 10/1993 | Pacquesi ............... 417/313 |
| 5,520,808 A | 5/1996 | Stoneburger et al. |
| 5,702,607 A | 12/1997 | Lawson |
| 5,815,544 A | 9/1998 | Lefter |
| 6,793,813 B1 | 9/2004 | Ethridge et al. |
| 6,843,910 B1 | 1/2005 | Thomas |
| 6,869,530 B1 | 3/2005 | Venezia |
| 6,875,364 B2 | 4/2005 | Gordon |
| 7,101,420 B1 | 9/2006 | Ellis |
| 7,241,382 B2 | 7/2007 | Gordon |
| 7,347,933 B2 | 3/2008 | Berry, III et al. |
| 2006/0064825 A1 | 3/2006 | Reed |

FOREIGN PATENT DOCUMENTS

| | | |
|---|---|---|
| CA | 1327482 | 7/1991 |
| CN | 2338331 Y | 9/1999 |
| CN | 2659957 Y | 12/2004 |
| JP | 550110612 | 1/1980 |

(Continued)

OTHER PUBLICATIONS

PCT/US2011/034761; Perez, Antonio; PCT International Search Report and Written Opinion Feb. 29, 2012.

(Continued)

*Primary Examiner* — Terry Cecil
(74) *Attorney, Agent, or Firm* — Gearhart Law, LLC

(57) ABSTRACT

A liquid transfer device having a housing with a top end, a bottom end, a sidewall, and an inner cavity. The sidewall has an inner surface and an outer surface. There is a plurality of openings traversing said sidewall. Also present is a filtering surface that covers the openings. The water or other liquids are pumped or transferred with a pump contained inside the inner cavity, with a fluid exit used for carrying the water out towards exterior hosing.

16 Claims, 11 Drawing Sheets

(56) References Cited

FOREIGN PATENT DOCUMENTS

| | | |
|---|---|---|
| JP | 62033509 | 2/1987 |
| JP | 63194708 | 8/1988 |
| JP | 03101886 | 4/1991 |
| JP | 06276891 | 10/1994 |
| JP | 23080010 | 3/2003 |
| JP | 23080243 | 3/2003 |
| JP | 27061748 | 3/2007 |
| WO | WO 94/13380 A1 | 6/1994 |
| WO | WO 03/064106 A1 | 8/2003 |
| WO | WO 04000437 A1 | 12/2003 |
| WO | WO 2007/040421 A1 | 4/2007 |
| WO | WO 2007/098059 A2 | 8/2007 |
| WO | WO 2007/098059 A3 | 8/2007 |

OTHER PUBLICATIONS

PCT International Preliminary Report on Patentability; PCT/US2011/034761 Nov. 15, 2012.

* cited by examiner

SITE DRAINER

CLAIM OF PRIORITY

This application claims priority to U.S. Ser. No. 61/329,641 filed on Apr. 30, 2010, the contents of which are fully incorporated herein by reference.

FIELD OF THE INVENTION

The invention relates to a fluid transfer device, in particular to a fluid transfer device having a heavy duty filter that may also function as a solid particle reducer when used without the filter.

BACKGROUND OF THE INVENTION

The invention relates to a novel device for draining or pumping water, or any fluid, contaminated or not, from locations such as, but not limited to, basements, backyards, loading docks, parking lots, flooded roads, sports fields, construction sites, mines, animal farms, landfills, scrap yards or backyards flooded with water. These areas are traditionally difficult to clear because contaminants such as, but not limited to, dirt, solid particles, debris or silt may enter the pump and damage the pump or jams the pump impeller. The present invention solves this problem by placing the pump in a specially created filtering assembly that keeps the contaminants, particularly the solid particles, from engaging the pump. The pump may also serve as an effective erosion and sediment control product. In such an application, the filtered water may then be pumped out of the filtering assembly, away from the area to be drained and to a suitable disposal site such as, but not limited to, a storm water drainage system, a creek, a river, a green area or some combination thereof.

Prior art units have disclosed several methods where debris can be filtered out without clogging up the entry openings or ports, yet none are as effective as the present invention.

Description of the Related Art:

The relevant prior art includes:

U.S. Pat. No. 7,241,382 discloses a self-cleaning, backwashable filter apparatus and method for use with a pumping apparatus which is at least partially immersed in fluid. The filter apparatus may comprise a vibration device that is powered by a flow of fluid. A method for filtering a flow of fluid is also disclosed, comprising vibrating a filter by applying a flow of fluid to the filter.

U.S. Pat. No. 6,875,364 discloses a self-cleaning, backwashable filter apparatus and method for use with a pumping apparatus which is lowered into a well casing. The filter apparatus includes a filter basket having a manifold with several tubes extending therefrom. A filter sock encases at least a portion of the filter basket to block sand or other solid particles from entry into the pump intake. Pressurized gas or fluid is directed to the manifold and then through perforations or jets distributed along the length of the tubes. Bursts of the pressurized gas are directed from the perforations or jets to the interior of the filter apparatus and then sprayed from the perforations or jets in an outwardly direction against interior surfaces of the filter sock. Air or fluid bursts from the perforations impinge upon the interior surfaces of the filter sock and dislodge or expel entrapped particulate material.

Various implements are known in the art, but fail to address all of the problems solved by the invention described herein. One embodiment of this invention is illustrated in the accompanying drawings and will be described in more detail herein below.

SUMMARY OF THE INVENTION

The present invention discloses a liquid filtering and transfer device.

In a preferred embodiment, the liquid filtering and transfer device may include a substantially rigid, space enclosing housing. The housing may have a top end, a middle cover, a bottom end, a sidewall, and an inner cavity. The middle cover, may, for instance, be used to create an upper storage volume with the housing.

A plurality of openings may traverse the sidewall of the housing. Each of these openings may fluidly connect the inner surface of the sidewall to its outer surface.

The liquid filtering and transfer device may further include a filtering surface that may be a contiguous surface that is permeable to a fluid being transferred by the device. The filtering surface may be located in proximity to either the inner or outer surface of the sidewall. The filtering surface may cover the plurality of openings in the sidewall of the housing.

In a preferred embodiment, the liquid filtering and transfer device may include an electrically driven fluid transfer pump that may be disposed within the inner cavity of the housing. The pump may have both inlet and exhaust manifolds, with the inlet manifold preferably located in proximity to the bottom end of the housing, and the exhaust manifold preferably located in proximity to the top end of the housing.

The liquid filtering and transfer device may include an electrical power switch that may be operative to switch the fluid transfer pump between an operational state and a standby state. In the operational state, the pump may transfer any suitable fluid such as, but not limited to, water. In the standby state, the pump may be turned off.

The liquid filtering and transfer device may also include a restrained floatation device. The restrained floatation device may include a restrained float that may be restrained to move only up and down, in a substantially vertical direction. The restrained floatation device is preferably functionally connected to the electrical power switch such that when a fluid fills the inner cavity of the housing to a level to only sufficiently cover an inlet manifold of the pump, it is switched into the standby mode, thereby preventing any damage from running it dry.

It is an object of the present invention to provide a liquid transfer device.

It is another object of the present invention to provide a liquid transfer device having a protective housing.

It is another object of the present invention to provide a liquid transfer capable of filtering the liquid being transferred.

Yet another object of the present invention is to provide a device for pumping water or other liquids out of from locations such as, but not limited to, basements, loading docks, parking lots, flooded roads, sports fields, construction sites, mines, animal farms, landfills, scrap yards or backyards flooded with water.

Still another object of the present invention is to provide a device capable of operating in either deep or shallow waters.

Still another object of the present invention is to provide a device where openings may be uniform or may vary in diameter, with the largest diameter being closest to the top of the housing.

Yet another object of the present invention is to provide a liquid transfer where a water level detection device controls the actuation switch for the liquid transfer motor.

Still another object of the present invention is to provide a device having a strong and fine filtration element that may be removed for cleaning.

Another objective of the invention is to provide a waterproof pump that operates in corrosive environments.

Another objective of the invention is to provide a housing to protect the float from debris that may cause it to stick in an on or an off position.

Another objective of the invention is to protect the pump from running dry and burning out.

DESCRIPTION OF THE PREFERRED EMBODIMENTS

Figure 1:
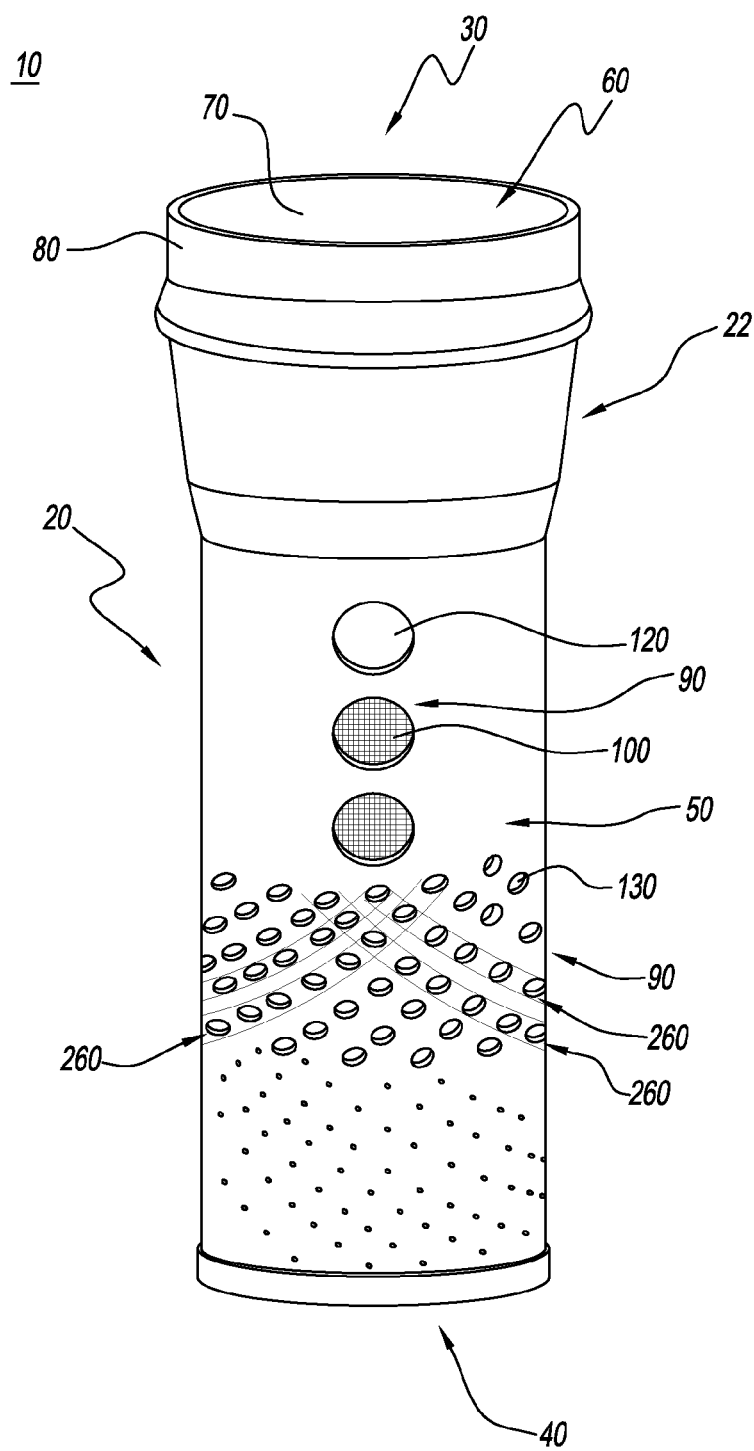
FIG. 1 is a close-up view of housing.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIG. 1 shown is a liquid filtering and transfer device 10, a substantially rigid, space enclosing housing 20, a top end 30 of the housing, a bottom end 40 of the housing, a middle cover that may be used as a center deck to provide storage room within the housing, a sidewall 50 of the housing, an inner cavity 60 of the housing, an inner surface 70 of the sidewall, an outer surface 80 of the sidewall, a plurality of openings 90 traversing the sidewall, a contiguous, filtering surface 100 that is substantially permeable to a fluid being transferred, large openings 120, small openings 130, and a plurality of spiral grooves 260.

The liquid filtering and transfer device 10 may be used for transferring water and other liquids. The device preferably contains a single pump (see FIG. 9), though one of ordinary skill in the art will readily appreciate that other embodiments that may have larger housings and may contain multiple pumps, that may, for instance, be arranged to pump in series or in parallel. The device 10 may be used in circumstances where the liquid being transferred or pumped is clear or non-contaminated or contains a substantial amount of impurities, such as, but not limited to, solid particles, silt, organic matter, sand, rocks, construction refuse, or any other type of debris or some combination thereof. The substantially rigid, space enclosing housing 20 is preferably cylindrical, but may be of any other shape. The housing 20 may be uniform in cross-section, though, in a preferred embodiment, it may widen toward its top end 30 to allow easier deployment. The housing 20 may, for instance, be sized to suit the application for which it is intended. For typical applications such as those referred to above, the housing 20 is preferably sized to have a height in a range of between 2 and 4 feet, and a width in a range between 10 inches and 2 feet. However, one of ordinary skill in the art will readily appreciate that larger or smaller versions may be constructed. For example, housings up to 10 or even 20 feet in height and 10 feet in width may be necessary for draining very large or very deep areas. Large housings may, for instance, be moved using a crane or other heavy machinery. Likewise, smaller versions for backyard use can also be foreseen.

The housing may be made of plastics, PVC, metal, or wood. The sidewall 50 of the housing has no particular width, but should preferably be able to withstand battering from a moderate flow of liquid containing solid particles or with suspended impurities such as, but not limited to, rocks, pebbles, silt and other debris. The housing 20 may, for instance, be uniform in width or it may have a top section 22 that is slightly wider than the rest of the sidewall 50. This may be desirable to provide easy access to the internal components of the device 10. In another, preferred embodiment, the space in a vicinity of the top end 30 of the housing may be used as a storage compartment for miscellaneous items such as, but not limited to, unused electrical cable, an operations manual, spare filters, spare parts or some combination thereof. (See FIG. 9).

Figure 5:
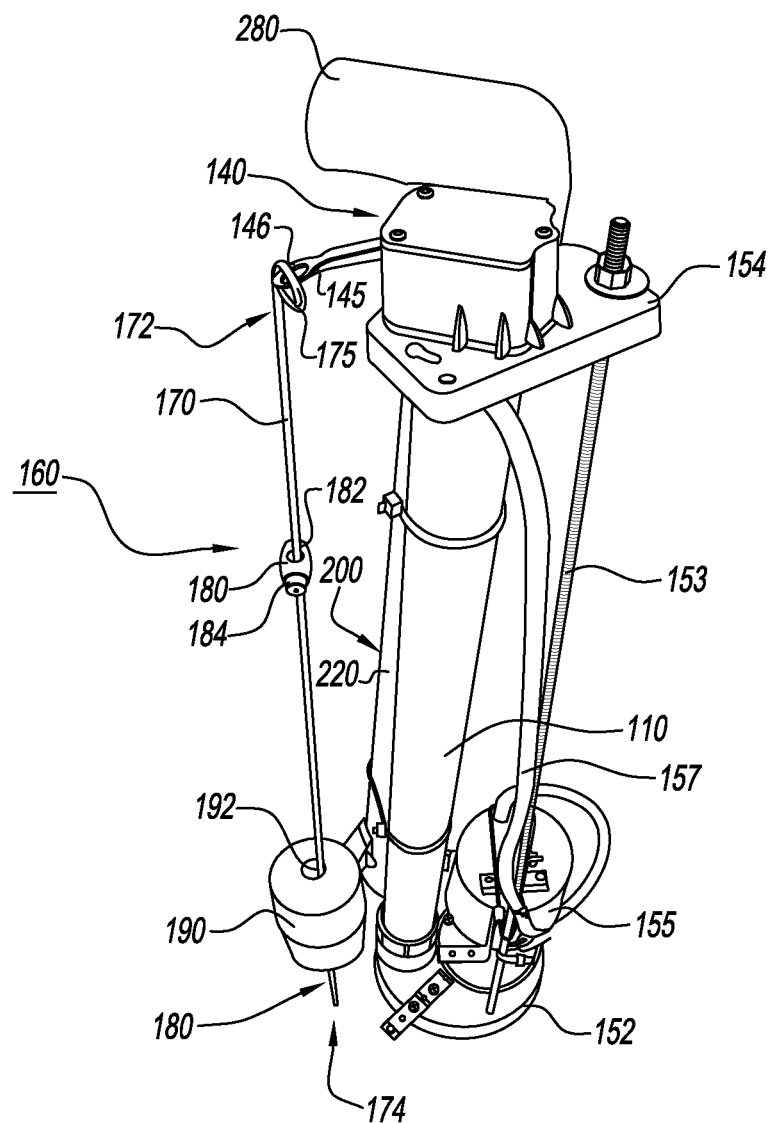
FIGS. 5 and 6 are views of the fluid transfer device.
Figure 6:
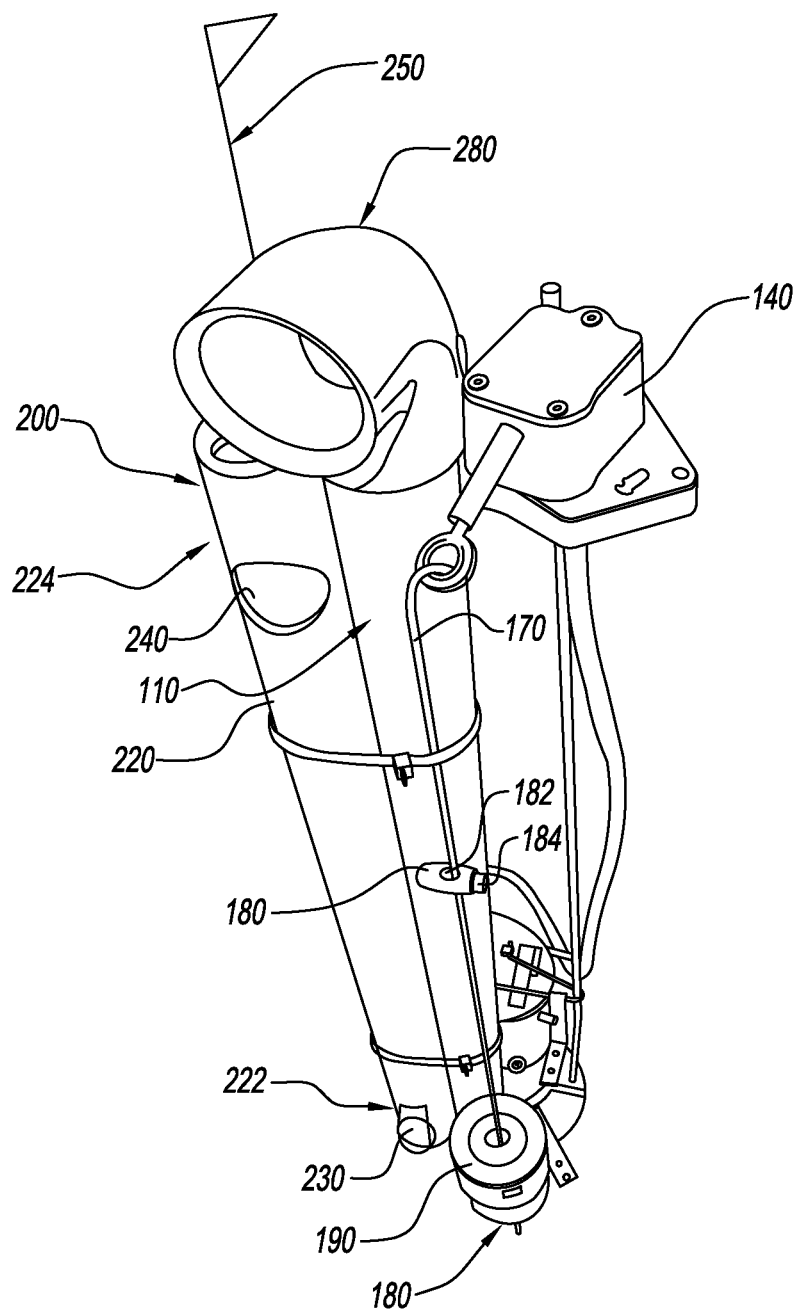

The sidewall 50 preferably contains a plurality of plurality of openings 90. These may, for instance, be one or more series of openings 90 having a similar configuration. For instance, a top most set of openings 90 may contain the largest openings 120, while the portion closest to the bottom end 40 may contain smaller openings 130. The openings may also gradually increase in diameter from the bottom end 40 towards the top end 30. The openings may function as inlets that may strain or filter the water, while permitting the water to enter the internal cavity 60, where it may then be pumped out through an exhaust manifold 110 of the fluid transfer pump, that preferably includes a check valve to prevent back flow. (FIGS. 5 and 6).

Although the plurality of openings 90 traversing the sidewall may be uniform in size, having them be of variable size may make fluid filtration faster and more efficient. This may occur as a consequence of the fact that regions closest to the surface of a typical site are often largely free of debris or contain the largest debris particles. In contrast, the smallest and heaviest particles, such as silt, soil and rocks, are typically found near the bottom of drainage sites. The larger openings 120 may, however, still be small enough to keep this larger debris out of the inner cavity 60, while providing for a greater and less obstructed inflow of water.

In non-metallic implementations of the liquid filtering and transfer device, filtration may further be assisted by the presence of optional spiral grooves 260. The grooves 260 may, for instance, run directly over the openings 90 and intersect each other. The grooves 260 assist in channeling debris away from the larger openings 120 and toward the bottom end 40. As the debris is driven toward the outer surface 80 of the sidewall 50, it becomes trapped by the openings 90 and by the filtration surface 100. The present invention harnesses the natural flow of fluids by using the grooves 260, to channel debris downwards, thus keeping the openings clear for as long as needed, or at least for longer periods than in prior art devices. To further assist with inflow of fluids, the filtering surface 100 may be forced deeper into the inner cavity 60, towards the bottom end 40, thus uncovering the top most openings 90.

The various parts of the present invention may be made from any material, including but not limited to: plastics and resins including but not limited to plastic, rubber, foam, silicone, ABS, Polycarbonate, Noryl™, PVC, Polystyrene, ABS/PVC, PVC/Acrylic, Polysulfone, Acrylic, Polyethylene, Kydex™, PETG; glass, including but not limited to fiberglass, borosilicate, or quartz; wood; metals, including but not limited to iron, stainless steel, tin, aluminum, copper; rubber including but not limited to natural rubber, SBR, Isoprene rubber, Butadiene rubber, and chloroprene rubber; or any combinations or composites of these materials or other materials and new materials that may be developed or manufactured in the future.

Figure 2:
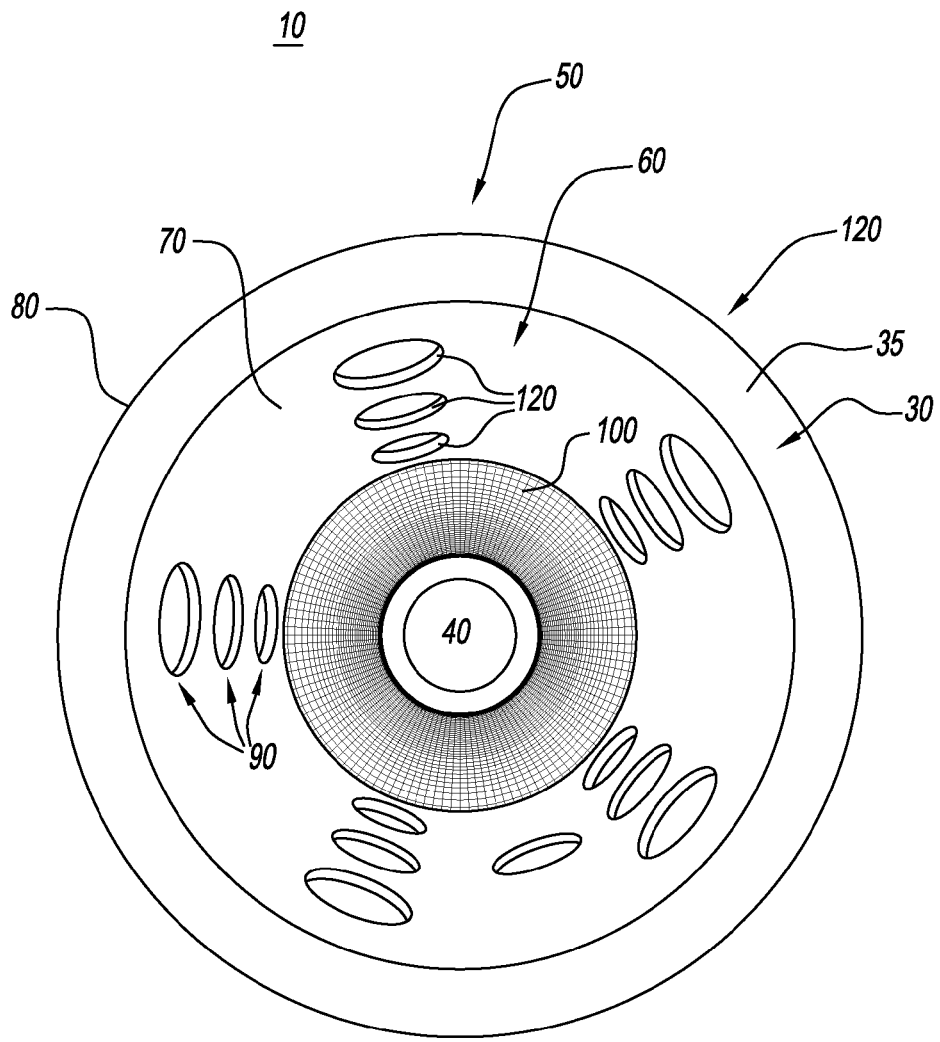
FIG. 2 is an inside cavity of the housing with the fuel transfer motor removed

FIG. 2 is a top view of the housing 20 without a pump installed and shows a top end 30 of the housing, a top lip 35, a bottom end 40 of the housing, a sidewall 50 of the housing, an inner cavity 60 of the housing, an inner surface 70 of the sidewall, an outer surface 80 of the sidewall, a plurality of plurality of openings 90 traversing the sidewall, and a contiguous, filtering surface 100 that may be permeable to a fluid being transferred. In this diagram, the filter surface 100 is separated into two parts, with only a bottom part shown. Alternatively, the filter may cover part or all of the inner surface 70 of the sidewall, or the outer surface 80 of the sidewall.

When situated on the inner surface 70 of the sidewall, the filtering surface 100 may include a reinforcing material such as, but not limited to, a wire mesh.

When situated on the outer surface 80 of the sidewall, the filtering surface 100 may be a flat surface and have a zipper, or a hook and loop fastener such as VELCRO™, to allow it to be wrapped in place around the housing 20.

The filtering surface 100 may, for instance, be made of woven or non-woven fabric that may have a variety of different flow rates. The filtering surface 100 may also be made of an erosion control material such as, but not limited to, straw, coir-fiber, polypropylene, coconut, jute netting, or a straw blanket or some combination thereof. When intended for use on the inner surface 70 of the sidewall, the filtering surface 100 may, for instance, be made of a wire mesh reinforced synthetic fiber such as, but not limited to, cloth, Tencate®, or Mirati® type products or some combination thereof. Other suitable filtering surfaces 100 may include filtering technologies such as, but not limited to, granular activated carbon filters, metallic alloy filters, micro-porous ceramic filters, carbon block resin (CBR) filtering, an ultra-filtration membrane, or some combination thereof. When used on the outer surface 80 of the sidewall, the filtering surface 100 may, for instance, be a blanket wrapped around the housing 20 and held in place by, for instance, a zipper, or a hook and loop fastener such as VELCRO™. Alternately, the filtering surface 100 may be enclosed in a sack of suitable material that may be a degradable, non-reusable, erosion control sack.

Figure 3:
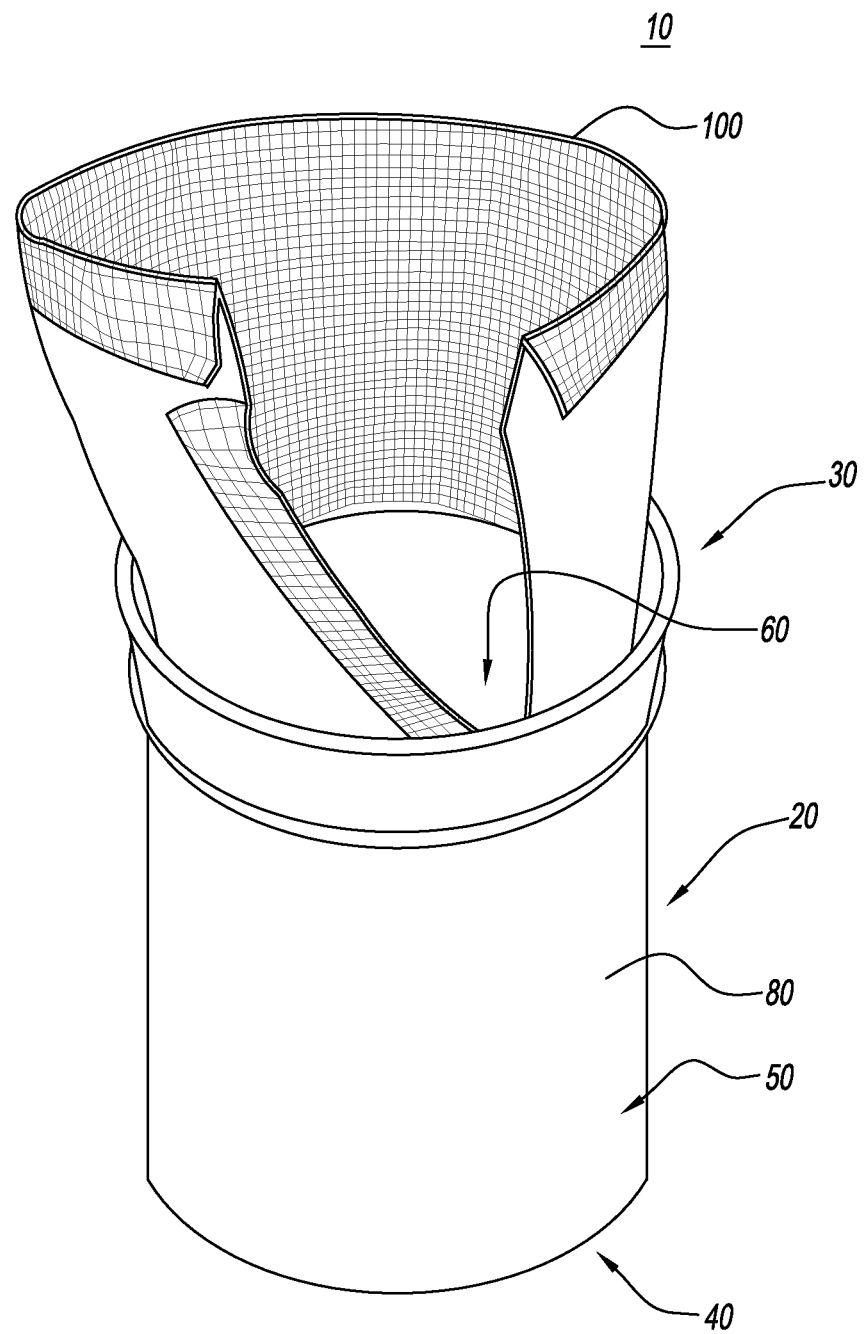
FIG. 3 is an exposed filter surface.

FIG. 3 shows how the filtering surface 100 may be installed inside the housing 20. It may be preferable to dispose the filtering surface 100 on the inside surface 70 (FIG. 2). This type of installation may extend the life of the filtering material being used. Alternatively, the filtering surface 100 may be installed on the outer surface 80, or a filtering surface 100 may be installed inside the housing and a separate filtering surface may be installed on the outside. For example, the filter may be constructed as a sack made from a filter material such as, but not limited to, a suitable erosion control material as listed above. Alternatively, the filtering surface 100 may be made in the form of a large cage covered entirely in filtering material that surrounds all or part of the housing 20. The benefit of such exterior installation is that the filtering surface 100 is easier to clear and install. As shown, the filtering surface 100 may be inserted and removed through the opening in the top end 30. In another alternative there may be one or more types of filtering surfaces 100, one for straining small particles and the other for filtering only the larger debris fragments. The former may be applied to the small openings 130, while the latter may be used with the larger openings 120. Or the housing 20 itself may be the filter, or part of it, if the openings 90 are small enough. In yet another alternative, there may be a valve or a diaphragm along the outer surface 80 or the inner surface 70, which may be capable of covering all or some of the openings 90.

Figure 4:
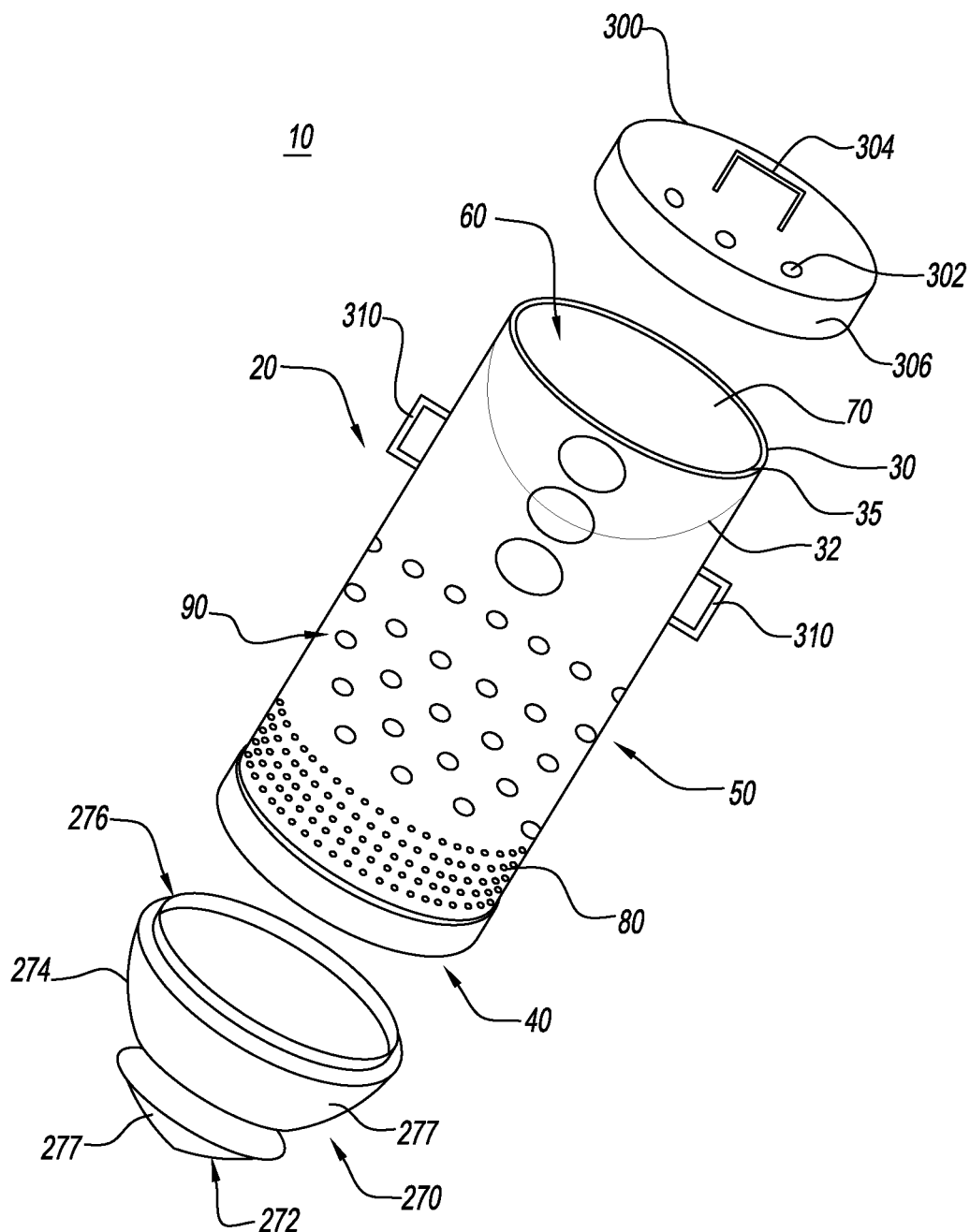
FIG. 4 is an exploded view of the housing, the burrowing attachment, and the lid.

FIG. 4 is an exploded view of the device 10. Shown are a liquid filtering and transfer device 10, a housing 20, a deck for storage room, a top end 30 of the housing, a bottom end 40 of the housing, a sidewall 50 of the housing, an inner cavity 60, a plurality of openings 90, a burrowing attachment 270, a top cover 300 of the housing and a handle 310.

The top cover 300 may be made out of the same or different materials as the rest of the housing 20. Preferably the top cover 300 of the housing contains openings 302 to permit some parts of the fluid transfer motor to protrude from the housing 20. These openings may also be used to accommodate other items that may need to protrude out of the top of the housing 20 such as, but not limited to, PVC piping, power cords, the visual level-indicator or some combination thereof. The opening in the top cover 300 of the housing may have tabs or covers such as punch out covers, or covers that may be removed and replaced when a particular opening is no longer needed. One of the openings 302 may permit a visible level-indicator 250 (FIG. 6) to traverse the cover 300.

The cover 300 may be mounted on top of the upper lip 35, or may be inserted into the internal cavity 60, until it is completely or partially submerged within the sidewall 50. A handle 304 may be used to assists with handling of the cover 300. The handle may also serve to serve to store an extension cord wrapped around it. There may also be latches, snaps or other connectors on the cover 300 and on the top end 30, which would hold the cover 300 securely in place. In another alternative, the sidewall 306 of the cover 300 may have frictional tabs or a thread for a more secure mating with the inner surface 70 of housing 20.

Shown is a burrowing attachment 270 which is optional. It may be attached to the bottom end 40. The burrowing attachment 270 may be made from two or more parts, it may be a single part, or may be monolithic with the housing 20. Also shown in FIG. 4 are the conical part 272 and the intermediary part 274. The burrowing attachment 270 may be attached to the housing 20 with a threaded connection, a frictional connection or a snap connection. There may also be latches, tabs or clasps and on the joint 276 of the intermediary part 274 and on the bottom end 40. The conical part 272 may connect to the intermediary part 274 with a rail and groove fastener (not shown), or by using any other type of connection, such as a threaded, or a snap-in connection.

The primary purposes of the burrowing attachment 270 is to enable the housing 20 to be placed deeper into the bottom surface of the area from which the water is being extracted, and to reduce frictional forces when the housing 20 is being removed. Therefore, the exterior surface 277 of the burrowing attachment 270 may be made of tough and hard materials, such as metallic alloys, steel or iron. The burrowing attachment 270 may also be made disposable and be left in the ground when the rest of the liquid filtering and transfer device 10 is removed. In such an embodiment, the burrowing attachment 270 may be made of PVC or a degradable material such as one of those discussed above. The exterior surface 277 may also contain a thread or downward grooves, to assist with the burrowing effort. The burrowing attachment 270 may be solid or hollow. However, it is preferable that the interior cavity 60 is not in communication with the burrowing attachment 270.

The sidewall 50 may contain handles 310. The handles 310 may be parallel to each other and disposed on either side of the outer surface 80. Alternatively, or in addition, there may be an elliptical bucket handle 312 at the top part 30. The bucket handle 312 may be used to lift the device 10 upwards, while the handles 310 may be utilized to position and secure the device on a surface. In a preferred embodiment, the liquid filtering and transfer device 10 may have a top carry handle for manual handling and a side ring for crane handling. Alternatively, only one set of handles may be present along with the side ring for crane handling.

FIGS. 5 and 6 illustrate an embodiment of the fluid transfer motor 150. Also shown is an fluid exit 110, a power switch 140, a flotation device 160, a rod 170, an adjustable limit 180, a float 190, a fluid level indicator 200, a casing 220, an intake valve 230, an outlet valve 240, a flag pole 250, and an exhaust pipe 280.

Preferably, all internal parts sit as one unit on the base 152. The fluid transfer motor preferably sits on base 152. When the fluid transfer motor 150 is within the inner cavity 60, the base 152 is supported by the interior face of the bottom end 40. The base 152 provides support for all of the components included in the fluid transfer motor 150. The base 152 also functions as a main intake mechanism for the pump motor 155.

Mounted directly unto the base 152 are a pump motor 155, a fluid exit 110, and a connecting rod 153. The pump motor 155 is preferably at the bottom of the fluid transfer motor 150, but pump motor 155 could also be mounted at any height relative to base 152. For example, the pump can be raised to nearly the top of the housing, with a pipe extending from the pump to the base. A preferred pump 155 may, for instance, be an R400 "Silver Bullet" dewatering pump manufactured by BJM Pumps, Old Saybrook, Conn. Pumps with mechanical floats or with electronic sensors can be used. However, any other sump pump or a water pump may be suitable. One skilled in the art will be able to appreciate that any water or sump pump could be modified for use with the present invention.

The electrically driven fluid transfer pump 155 may take in fluids present in the inner cavity 60, through the strainer in the base 152. The fluids may then be transferred to the exhaust manifold 110 of the fluid transfer pump. The action of the pump 155 may also produce an upward fluid pressure within the fluid exit 110, to drive any fluids within the fluid exit 110 towards the exhaust pipe 280. The exhaust pipe 280 protrudes through the sidewall 50 (FIGS. 1, 2, and 9) of the housing 20, and is preferably connected to a hose, suction hose, discharge hose, pipe, trough or channel. Alternatively, the exhaust pipe 280 may be connected to a separate valve that may be opened or closed.

The connecting rod 153 is used provide support for the upper platform 154 and a vertical support for the fluid exit 110 and the casing 220 of the fluid level indicator 200. The upper platform 154 supports a power switch 140, which connects to the pump motor 155 with wiring 157.

The power switch 140 is activated by the switch lever 145 that is connected to a flotation device 160. The flotation device 160 is preferably made up of a rod 170, adjustable limits 180 and a float 190. The rod 170 is preferably a thin rod of a light, rustproof material such as, but not limited to, metal, stainless steel, a metal alloy, a plastic or some combination thereof. The rod 170 contains a loop 175, or a hook that is inserted into the eye 146 of the switch lever 145. An adjustable limit 180 contains an opening 182 through which the rod 170 is inserted and then secured with a spring loaded or set screw activated clamp 184, which is initially released to insert the rod 170. The set screw or spring loaded clamp 184 of the adjustable limit 180 can subsequently be released to adjust the altitude of the adjustable limit 180 along the rod 170. One adjustable limit 180 should preferably be slid toward the top of the elongated element 172 to set the maximum fill level before the pump motor 155 is turned on. A second adjustable limit 180 is placed towards the bottom 174. The lower adjustable limit 180 indicates the minimum permitted level of liquid, below which the liquid transfer motor 150 must be shut off to prevent damage to the pump motor 155.

A float 190 contains an opening 192 in its center for insertion of the rod 170. The width of the opening 192 is preferably larger than the diameter or width of the rod 170, to permit free movement or between these components. As fluids fill the inner cavity 60, the float 190 will slide upwards towards the top part 172, until it reaches the adjustable limit 180. The adjustable limit 180 cannot fit through the center opening 192. As a result, the float 190 begins exerting an upward pressure on the limit 180, which pushes the entire rod 170 upwards. Eventually the switch lever 145 is pushed upward into an ON position that activates the pump motor 155.

As an inundated area is drained, the level of water or other liquids inside the inner cavity 60 may begin to drop. The float 190 will now sink and travel downwards towards the bottom 174. Eventually the float will encounter a second or lower limit 180 and begin exerting a downward pressure on it. The downward pressure will continue to be exerted as long as the water level inside the cavity 60 keeps falling. Eventually the switch lever 145 is pulled down enough to shut off the pump motor 155. Alternatively, the float may itself contain a clamp to securely affix to the rod 170. The rod 170 will then be directly affected by the rising and sinking of the float 190.

As an optional feature, one using the present invention may be able to monitor the device 10 remotely by viewing the height of the flag pole 250. The flag pole 250 may be a part of the fluid level indicator 200. The fluid level indicator 200 has a casing 220 that may be mounted vertically on the fluid exit 110. The casing contains an intake valve 230 and an outlet valve 240. The intake valve 230 is preferably located towards the bottom part 222 of the casing 220, while the outlet valve 240 is located toward the top part 224 of the casing 220. Internally, the casing 220 contains a float or a piston head (not shown). The flag pole 250 is inserted at the top part 224 and is mounted on top of this float or piston head. The piston head is prevented from traveling below the intake valve 230 by internal flange or tabs (not shown). The piston head is prevented from falling out of the open top part 224 by upper internal flanges or tabs (not shown) and by the outlet valve 240, which expels liquids from the casing 220 to relieve upward pressure on the piston head. As the level of water in the casing 220 rises, the piston head and the flag pole 225, rise with it. As the level of water in the casing 220 falls, the piston head sinks and flag pole 225 sinks also. Although FIGS. 5 and 6 demonstrate the preferred fluid transfer motor 150, other embodiments and all components and their arrangements inside the internal cavity 60 may vary.

Figure 7:
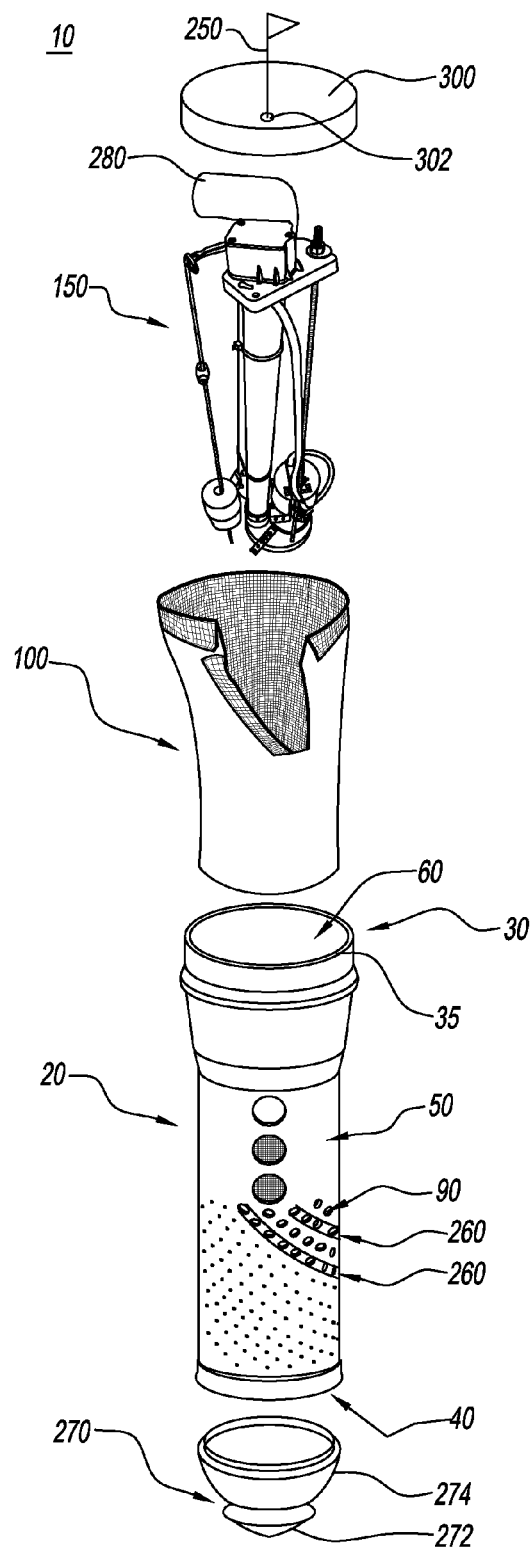
FIG. 7 is an exploded view of the device, showing the housing, the filtering surface and the fluid transfer device.

FIG. 7 is an exploded diagram showing the preferred assembly of the present invention. Shown in FIG. 7 are a liquid transfer device 10, a housing 20, a top end 30, a bottom end 40, a sidewall 50, an inner cavity 60, a plurality of openings 90, a filtering surface 100, a fluid transfer motor 150, a flag pole 250, a groove 260, a burrowing attachment 270, an exhaust pipe 280, an outside environment 290, and a top cover 300. As shown, the housing 20 may be mounted on top of a burrowing attachment 270, which may have parts 272 and 274, or may be a single part. The filtering surface 100 may be inserted through the top part 30 into the inner cavity 60, or it may optionally be a sock mounted externally on the sidewall 50. The fluid transfer motor 150 is placed into the inner cavity 60 and separated from the sidewall 50 by the filtering surface 100. The exhaust pipe 280 is inserted into an opening in the sidewall 50. The flag pole 250 is inserted into one of the openings 302 of the top cover 300.

Figure 8:
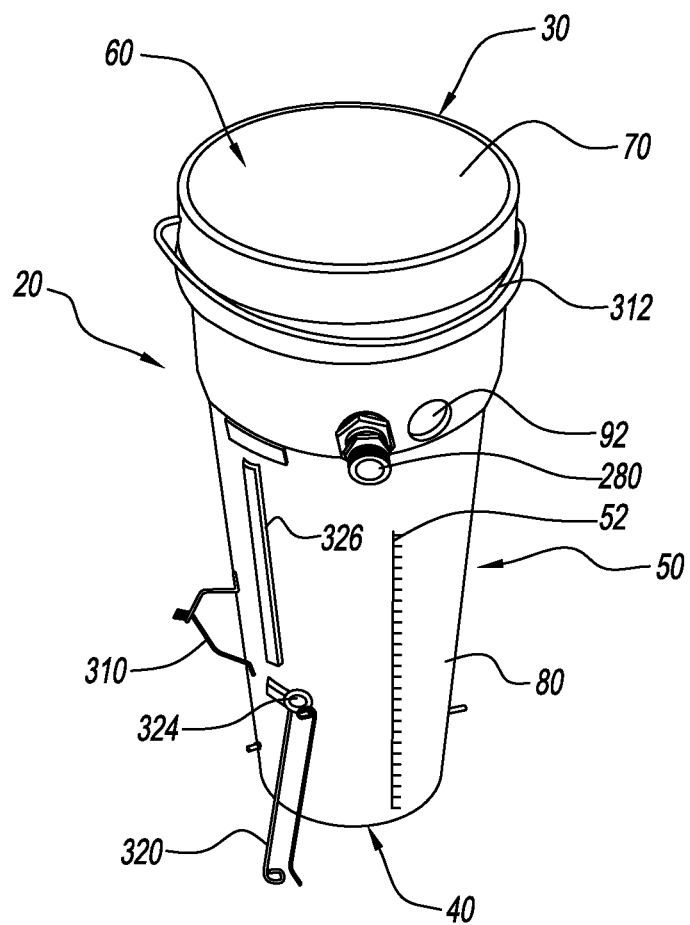
FIG. 8 is an alternative embodiment of the housing.

FIG. 8 is another view of the present invention. Shown are a liquid transfer device 10, a housing 20, a top end 30, a bottom end 40, a sidewall 50, an inner cavity 60, a filtering surface 100, an exhaust pipe 280, an outside environment 290, a top cover 300, handles 310 and 312, and a securing mechanism 320. The exhaust pipe 280 may function as a nozzle for a hose hookup. The exhaust pipe 280, as shown, is fastened to the sidewall 50. Alternatively, a section of the manifold 110 (FIGS. 5, 6) or an exhaust pipe 280 may be loosely inserted into the opening 92.

As stated in FIG. 4, there may be several handles 310 installed parallel to each other and on opposite sides of the housing 20. Alternatively, the handles 310 may be mounted in a row along the same side. The exterior surface 80 may contain a water level meter 52. A similar meter may exist on the interior surface 70. The sidewall 50 is shown in a preferred funnel or pitched shape, which widens towards the top end 30 and narrows towards the bottom end 40. The funnel shape is preferred since it helps bring about the downward flow of debris along the sidewall 50.

The securing mechanism 320 may be a series of metal rods or threads. Preferably 3 or more such mechanisms will be equidistantly placed around housing 20. The securing mechanisms 320 can be extended to balance the housing 20 in an upright position. This embodiment is especially useful if the invention is used to drain a sump or pit. The securing mechanism 320 is mounted on the sidewall 50 with loops or fasteners 324, and when not in use, may be secured to the outside surface 80 with hook and loop fasteners 326 or other securing loops or fasteners.

Figure 9:
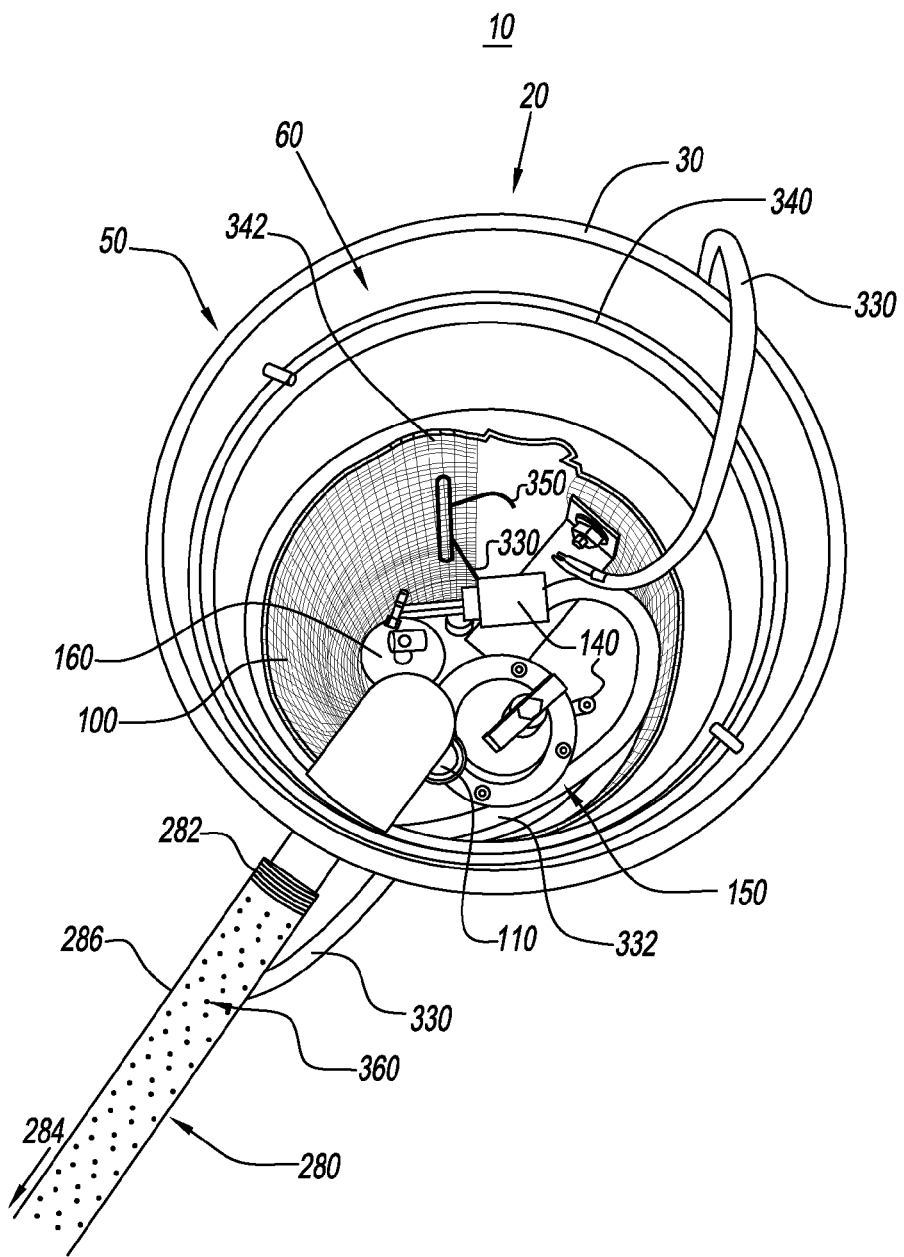
FIG. 9 is an inner cavity containing the fluid transfer device.

FIG. 9 is a diagram of the inner cavity 60 containing the filtering surface 100 along with the fluid transfer motor 150. Also shown is an external power cord 330, which alternatively may function as a fuel line. Also shown in FIG. 9 is a liquid transfer device 10, a housing 20, a top end 30, a sidewall 50, an inner cavity 60, a fluid transfer motor 150, an fluid exit 110, a large opening 120, a small opening 130, a power switch 140, a flotation device 160, an exhaust pipe 280, a power cord 330, a heating element 340 and a thermostat 350. The heater may be made up of insulated heating elements such as, but not limited to heating mesh 342 or coils 340 having high resistance to electric current.

The thermostat 350 may be mounted on the sidewall 50. There may be an additional thermostat inside or outside the fluid transfer motor 150. Alternatively, only the fluid transfer motor 150 would contain a thermostat. The thermostat 350 may be configured to trigger the heating elements at a specific temperature. Alternatively the thermostat 350 triggers as soon as the fluid inside the inner cavity 60 reaches or nears the freezing point. The thermostat 340 activates the power switch 140, which activates the heating element 340 and/or 342. The heating elements 340 and 342 may be disposed along the inside of the sidewall 50, as shown, or may be installed inside the fluid transfer motor 150. The heating element 340 may also be activated by a separate switch. In an alternative embodiment, the sidewall 50 may be impregnated with the heating elements.

FIG. 9 illustrates another preferred embodiment of the power cord 330. The power cord 330 may be integrated with an exhaust pipe 280. The power cord 330 may be attached to the sidewall 286 with bands, rings or strips, made of metal or plastic. The power cord 330 may also be impregnated into the sidewall 286 of the pipe 280. An integrated power cord 330 may connect to a socket (not shown) in the sidewall 50 of the device 10. An internal section of the power cord 332 may then connect the liquid transfer motor 150 to such a socket.

The exhaust pipe 280 may be a hose with one end 282 connecting to fluid exit 110 and the other end 284 left open. Alternatively, the other end 284 may connect to a manifold intake pipe (not shown) that may accept connections from other similar hoses or pipes. In such a way, multiple liquid transfer devices 10 may be linked to the same exhaust line (not shown).

In an alternate embodiment, the liquid transfer device may be constructed so it floats, rather than resting on the bottom of the area to be drained. The liquid transfer device then rises or falls with the depth of the flooded area. It may be desirable to anchor the floating liquid transfer device, either with a rope, chain or other anchor. Alternatively a pole can be anchored at the bottom of the flooded area and the liquid transfer device can be moveably connected to the pole to rise and fall with the water level.

Figure 10:
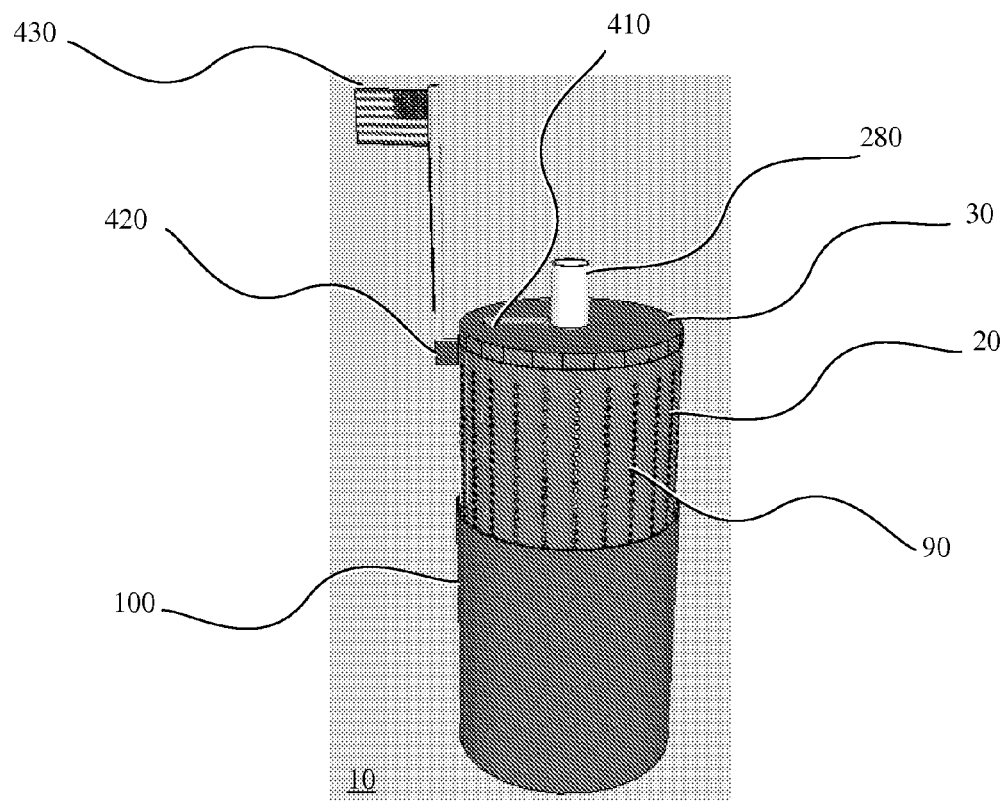
FIG. 10 shows an isometric view of a further embodiment of the liquid filtering and transfer device.

FIG. 10 shows an isometric view of a further embodiment of the liquid filtering and transfer device. The liquid filtering and transfer device 10 may include a substantially rigid, space enclosing housing 20 having a plurality of openings 90 traversing the sidewall of the housing 20. The liquid filtering and transfer device 10 shown in FIG. 10 has a contiguous, filtering surface 100, that may be substantially permeable to a fluid being transferred, surrounding the lower half of the housing 20. The liquid filtering and transfer device 10 may also have a top end 30 of the housing through which a fluid exhaust pipe 280 may protrude. The top end 30 of the housing may also have an electrical power cable 410 protruding through it.

The housing 20 may have a flag holder 420 rigidly attached to an outer surface. The flag holder 420 may for instance, contain a pole to which a flag 430 may be attached. Such a flag 430 may, for instance, be used to locate the liquid filtering and transfer device 10 when it is submerged at a working location.

Figure 11:
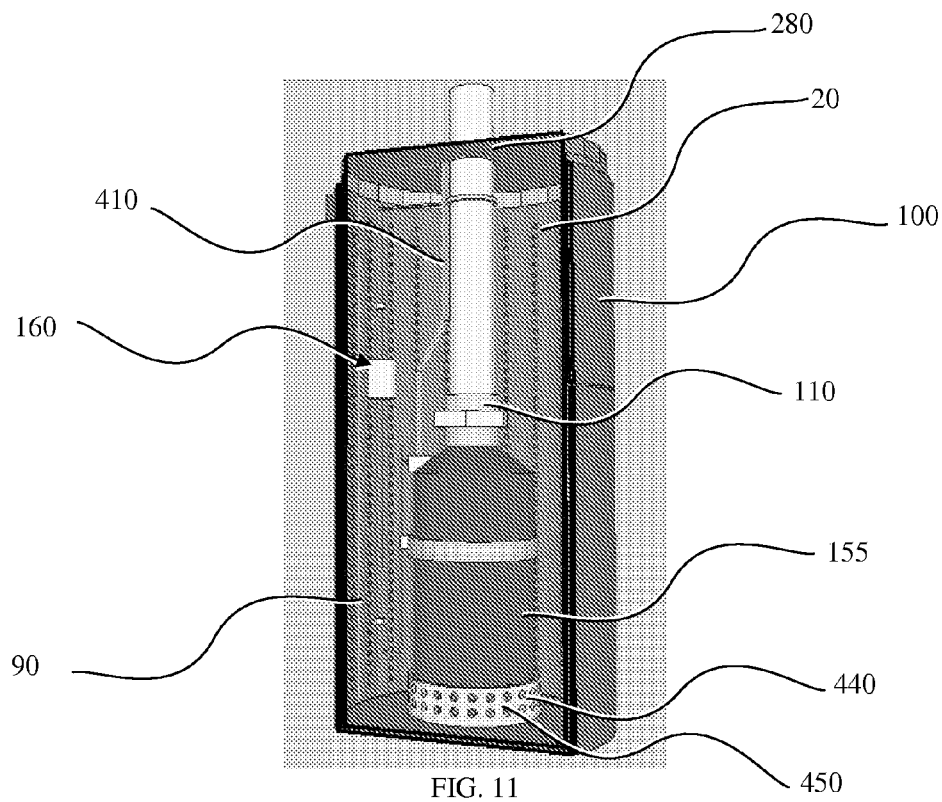
FIG. 11 shows a cross-sectional isometric view of a further embodiment of the liquid filtering and transfer device

FIG. 11 shows a cross-sectional isometric view of a further embodiment of the liquid filtering and transfer device.

FIG. 11 shows the electrically driven fluid transfer pump 155 that may be housed inside the substantially rigid, space enclosing housing 20. The fluid transfer pump 155 may have an exhaust manifold 110 of the fluid transfer pump that may be connected to the fluid exhaust pipe 280. The fluid transfer pump 155 may an inlet manifold that may have a check value to prevent backflow. The inlet manifold 115 of the fluid transfer pump may also be surrounded by an inlet strainer 440 located at its base. The inlet strainer 440 may have a plurality of plurality of strainer openings 450 that may fluidly connect the inlet manifold to the inner cavity of the housing 20. The strainer openings 450 may each have a substantially similar strainer opening size.

In a preferred embodiment, the openings 90 traversing the sidewall of the housing 20 are smaller than the inlet strainer openings 450. In this manner, the inlet strainer 440 may be prevented from being clogged.

Also shown in FIG. 11 is an electrical power cable 410 that may supply power to the fluid transfer pump 155 under control of the restrained floatation device 160.

Figure 12:
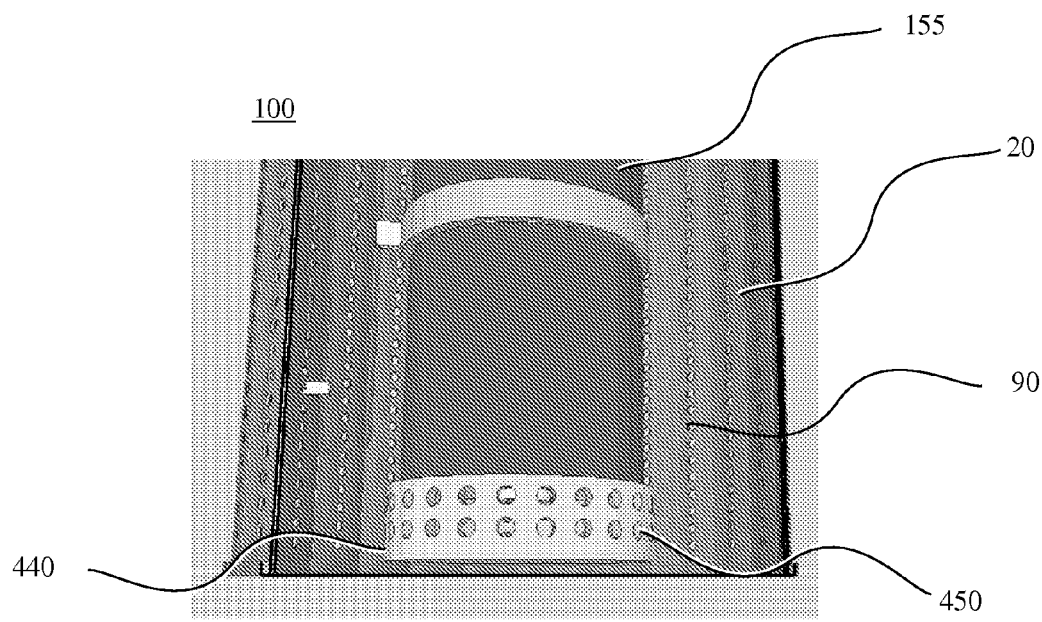
FIG. 12 shows a close up, cross-sectional view of a lower part of the liquid filtering and transfer device.

FIG. 12 is a close up, cross-sectional view of a lower part of the liquid filtering and transfer device. The close shows the base of the fluid transfer pump 155 having a inlet strainer 440. The inlet strainer 440 may have a plurality of strainer openings 450. In a preferred embodiment, of the liquid filtering and transfer device 10, the plurality of openings 90 traversing the sidewall of the substantially rigid, space enclosing housing 20 have openings with a maximum size that is at least ⅛th of an inch smaller than the size of the strainer openings 450. This may insure that the inlet strainer 440 does not become clogged and therefore inoperative, no matter what debris is in the water, or other fluid being filtered and transferred by the liquid filtering and transfer device 10.

Figure 13:
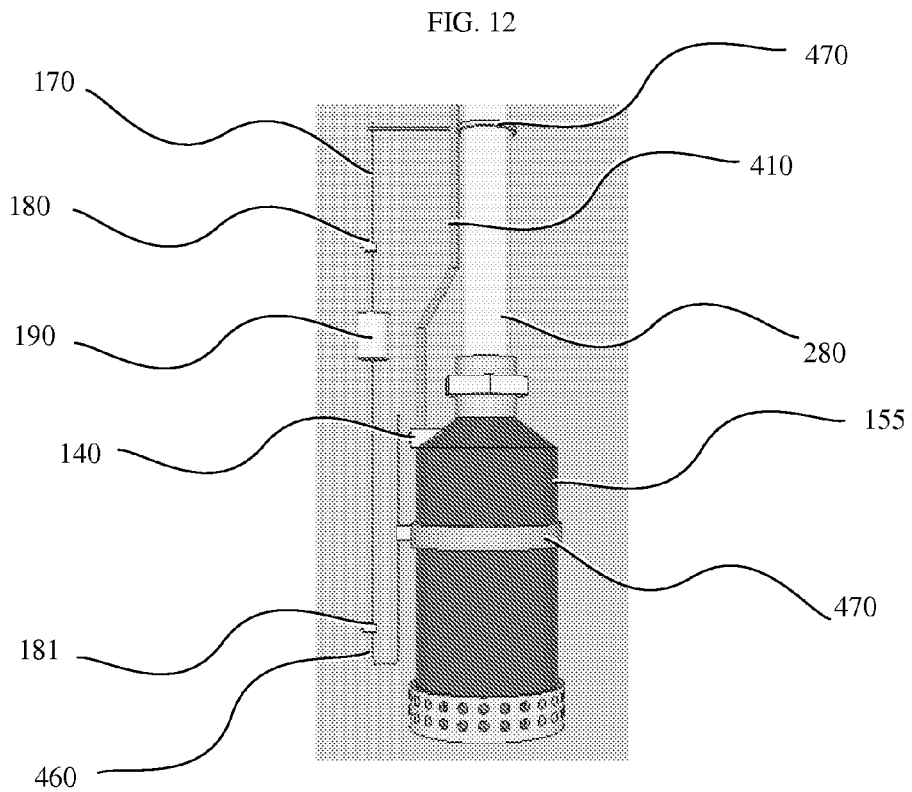
FIG. 13 shows a side view of the fluid transfer pump and the floatation control device.

FIG. 13 shows a side view of the fluid transfer pump and the floatation control device. The restrained floatation device 160 may include a elongated element 170 that may, for instance, be a suitable metal or plastic rod. In a preferred embodiment, the elongated element 170, or rod, may have a U shaped bend 460 at its lower end. The elongated element 170, or rod, may be held in position by, for instance, an attachment collar 470 that may be attached to the fluid transfer pump 155, or by an attachment collar 470 that may be attached to the fluid exhaust pipe 280 or by an appropriate assortment of such attachment collars 470.

The elongated element 170, or rod, may be connected at one end to an electrical power switch 140 that may be operative to switch the electrically driven fluid transfer pump 155 between an operational state and a standby state. The standby state may also be an off state. The restrained floatation device 160 may include a restrained float 190, restrained to move only in a substantially vertical direction along the elongated element 170, or rod, between an upper adjustable limit 180 attached to the rod, and a lower adjustable limit 181. In this manner, when a fluid level within the inner cavity of the housing 20 falls below a preset height, the electrical power switch may switches the electrically driven fluid transfer pump to the standby mode or off mode, thereby preventing the fluid transfer pump from running while dry and being damaged.

By having the U shaped bend 460 in the elongated element 170 restrained floatation device, the lower limit may be set as close to the bottom end of the housing 20 as desired by suitable adjustment of the lower adjustable limit 181.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A liquid filtering and transfer device, comprising:
    a substantially rigid, space enclosing housing said housing having a top end, a bottom end, a sidewall, and an inner cavity and wherein said sidewall of said housing has an inner surface and an outer surface;
    an electrically driven fluid transfer pump having an inlet manifold, surrounded by an inlet strainer, located in a vicinity of its lower end, said fluid transfer pump being disposed within said inner cavity of the housing, and having said inlet manifold located in a proximity of said bottom end of the housing, and wherein said inlet strainer has a plurality of strainer openings fluidly connecting said inlet manifold to said inner cavity, and wherein said strainer openings have a substantially similar strainer opening size;
    a plurality of openings traversing said sidewall, each of said openings fluidly connecting said inner surface of said sidewall to said outer surface of said sidewall, and wherein said openings have a maximum size that is smaller than said strainer opening size;
    an electrical power switch operative to switch said electrically driven fluid transfer pump between an operational state and a standby state; and
    a restrained floatation device comprising a restrained float restrained to move only in a substantially vertical direction, said restrained floatation device being functionally connected to said electrical power switch such that when a fluid level within said inner cavity of the housing falls below a preset height, said electrical power switch switches said electrically driven fluid transfer pump to said standby mode, thereby preventing said fluid transfer pump from running while dry and being damaged.

2. The device of claim 1 further comprising a substantially contiguous, filtering surface that is substantially permeable to a fluid being transferred, said filtering surface being located in proximity to either said inner surface of said sidewall, or said outer surface of said sidewall, and covering said plurality of openings.

3. The device of claim 1, wherein said restrained floatation device further comprises an elongated element having adjustable limits, and wherein said restrained float is disposed between said limits.

4. The device of claim 1, further comprising a fluid level indicator having a piston head disposed in a fluid level indicator casing 220, said casing having a fluid intake valve 230 and a fluid outlet valve 240; and a visible level-indicator 250, said visible level-indicator 250 being connected to said piston head such that an indication of a fluid level may be discerned external to said liquid filtering and transfer device.

5. The device of claim 1, further comprising a plurality of substantially spiral grooves 260, said plurality of spiral grooves being disposed on said outer surface of said sidewall and traversing said plurality of openings.

6. The device of claim 1, wherein a filtering surface is disposed within said inner cavity of the housing.

7. The device of claim 1, wherein a filtering surface is disposed on the outer surface of said sidewall.

8. The device of claim 1, further comprising a burrowing attachment, fixedly connected to said liquid filtering and transfer device in a vicinity of said bottom end of the housing.

9. The device of claim 1, wherein said electrically driven fluid transfer pump is a submersible water pump.

10. The device of claim 1, further comprising a fluid exhaust pipe, said fluid exhaust pipe connecting an exhaust manifold of the fluid transfer pump to an external environment.

11. The device of claim 10, wherein said exhaust pipe further comprises a power cord.

12. The device of claim 1, further comprising a top cover, said top cover capable of admitting additional piping; a visible level-indicator, a power cord and a middle cover positioned to provide an upper storage volume.

13. The device of claim 1, wherein a width of said bottom end of the housing is less than a width of said top end of the housing, thereby forming a pitched sidewall.

14. The device of claim 1, further comprising at least one handle.

15. The device of claim 1, further comprising a securing mechanism that immobilizes said housing.

16. The device of claim 1, further comprising a thermostat and a heater, said heater activating a heating element when triggered by said thermostat.

* * * * *